July 15, 1924.

R. W. MOSES

SHEARS

Filed Feb. 21, 1923  3 Sheets-Sheet 1

1,501,714

INVENTOR
Richard W. Moses
By Byrnes, Stebbins & Parmelee
His Atty's

July 15, 1924.

R. W. MOSES

SHEARS

Filed Feb. 21, 1923

3 Sheets-Sheet 2

1,501,714

INVENTOR
Richard W. Moses
By Byrnes, Stebbins & Parmelee
His attys

July 15, 1924.

R. W. MOSES

SHEARS

Filed Feb. 21, 1923  3 Sheets-Sheet 3

1,501,714

INVENTOR
Richard W. Moses
By Byrnes, Stebbins & Parmelee
His Atty's

Patented July 15, 1924.

1,501,714

UNITED STATES PATENT OFFICE.

RICHARD W. MOSES, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

SHEARS.

Application filed February 21, 1923. Serial No. 620,365.

*To all whom it may concern:*

Be it known that I, RICHARD W. MOSES, a citizen of the United States, residing at Pittsburgh, in the county of Allegheny and State of Pennsylvania, have invented a new and useful Improvement in Shears, of which the following is a full, clear, and exact description.

The present invention relates to the art of metal working, and more particularly to an improved mechanism for shearing sheet or strip material as delivered by a roll table.

It has heretofore been proposed to shear such material delivered by a roll table by means positioned within the line of the roll table, or between sections thereof, and comprising a fixed cutting member positioned slightly below the delivery line of the table and a movable cutting member normally occupying a position above said delivery line. A serious objection to this type of shearing mechanism is that either the roll table has to take the powerful downward thrust of the material being sheared when the movable cutting member engages and cuts it, or a tiltable roll table must be provided, with special mechanism for lowering it at each shearing operation.

In order to avoid this objection to the down-cut type of shearing mechanism, it has been proposed to use a shearing mechanism of the up-cut lever type, comprising a fixed cutting member above the delivery line of the table and a movable cutting member normally occupying a position below said delivery line.

The present invention relates to a shearing mechanism of the last mentioned type and provides a construction wherein all of the operating parts are carried, independently of the roll table, by a supporting frame which extends both to one side of and above the roll table so that it overhangs the table from one side, leaving the same substantially continuous and unobstructed, permitting the shear to be bodily moved toward and from the table and to any point longitudinally thereof. Moreover, substantially all parts of the shear are supported outside the area beneath the roll table so that such parts are easily accessible and are not subjected to the destructive action of hot scale.

A preferred embodiment of the invention is illustrated in the accompanying drawings, in which—

Figure 1:
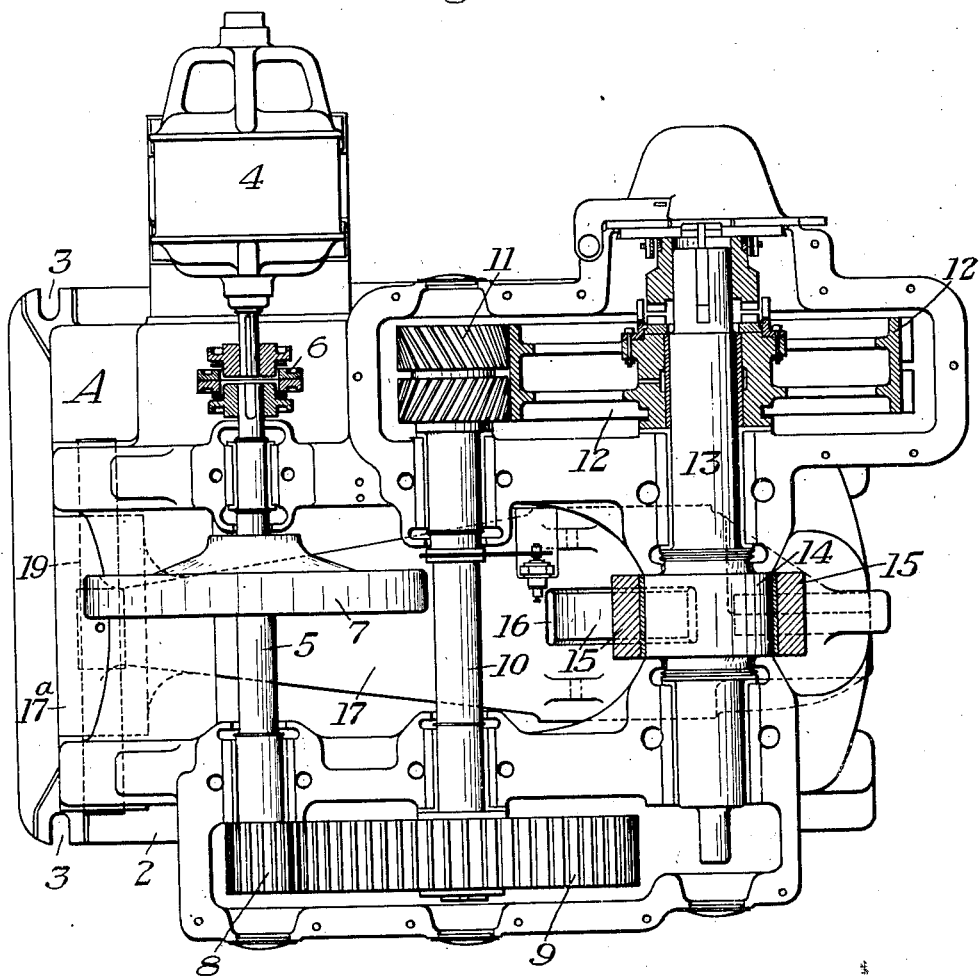
Figure 2:
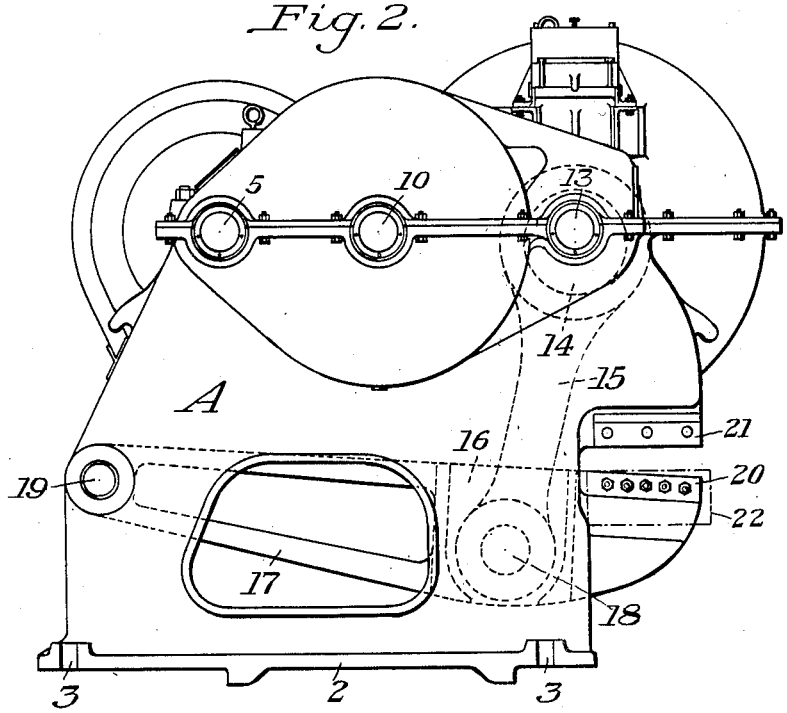
Figure 3:
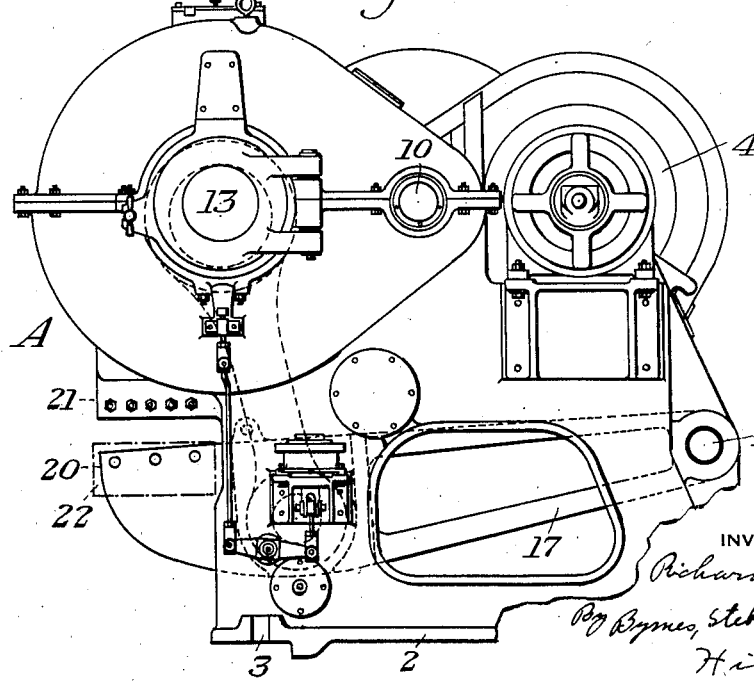
Figure 4:
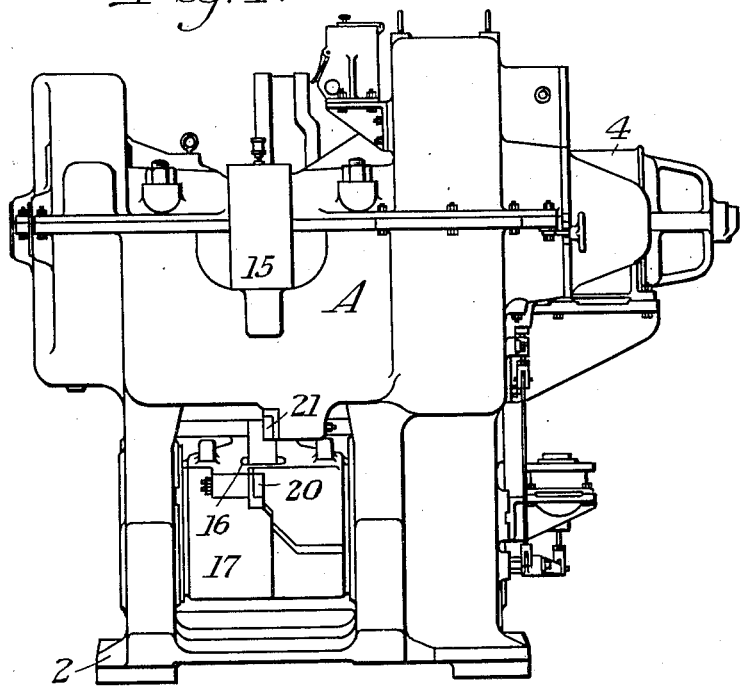
Figure 5:
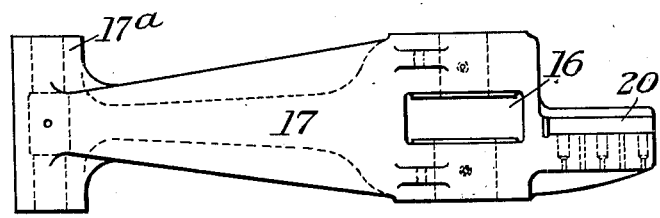

Figure 1 is a plan view of the device with the top cover of the supporting frame or housing removed to expose the parts contained therein;

Figure 2 is a side elevation of the device;
Figure 3 is a reverse side elevation;
Figure 4 is a front view thereof, and
Figure 5 is a plan view of the lever which carries the movable cutting member.

Referring to the drawings, particularly to Figure 1, the shear comprises a supporting frame or housing A in which all of the operating parts are carried. This frame or housing is provided in its base flange 2 with a plurality of slots 3 for the reception of bolts or other securing devices whereby to secure the housing in desired position.

The reference numeral 4 designates a motor which drives a motor pinion shaft 5 through a suitable flexible coupling 6. The shaft 5 is journaled in suitable bearings in the frame and carries a fly wheel 7 and pinion 8. The pinion 8 meshes with and drives a gear 9 on one end of the main shaft 10, the latter having fixed on its opposite end a double helical pinion 11 meshing with and driving a double helical gear 12 on the eccentric shaft 13.

The eccentric shaft 13 is provided with an eccentric 14 operatively engaging the upper end of a pitman 15. The lower end of the pitman 15 is arranged in a slot 16 in a lever 17 and is pivotally connected to said lever by pin 18 extending through the lower end of said pitman and fixed at its ends in the lever 17 at opposite sides of the slot 16. This lever is provided at one end with a broad bearing 17ᵃ adapted to receive a bearing pin 19 extending through the bearing 17ᵃ and supported at its opposite ends in said frame. This construction prevents any rocking or wear of the lever during operation. The lever 17 carries at its opposite end the movable cutting member 20 which cooperates with the fixed upper cutting member 21 carried by the frame.

The shearing mechanism, in operative position, has the supporting frame A extending both at one side of and above the roll table 22, the latter being indicated diagrammatically in Figure 2. It will be seen that the upper fixed cutting member 21 is arranged above the delivery line of the table 22 and that the lower movable cutting member 21 is normally arranged slightly below said delivery line. In the shearing operation the lower cutting member 20 moves upwardly to cooperate with the upper fixed cutting member 21 and in so doing slightly raises the material to be sheared from the roll table. Thus the roll table is not subjected to any thrust during the shearing operation.

An important advantage of the present invention arises from the provision of a shearing mechanism which is supported entirely independently of a continuous roll table intermediate the ends of the latter and which can be bodily moved toward or from the table and to any point in the length thereof.

A further advantage of the invention arises from the arrangement of the supporting frame of the device and the operating parts supported therein substantially entirely outside the area beneath the roll table so that these parts are not subjected to the destructive action of the hot metal scale.

A further advantage of the invention arises from the particular arrangement of the shearing mechanism with respect to the roll table whereby the latter is obstructed by the shearing mechanism on one side only.

A still further advantage of the invention arises from the provision of a shearing mechanism of such construction that the table is not subjected to the shearing load imposed on the material.

I claim:

1. In a shearing mechanism, a frame having a portion arranged to overhang a roll table and having the portion thereof below said overhanging portion arranged to lie substantially wholly at one side of said roll table, a fixed knife carried by said overhanging portion, a lever pivoted to said frame and projecting at one end beneath said overhanging portion, a knife carried by said projecting end for co-operating with said fixed knife, and means for operating said lever, substantially as described.

2. In a shearing mechanism, a frame having a portion arranged to overhang a roll table and having the portion thereof below the delivery line of such table arranged to lie wholly at one side thereof, a fixed knife carried by said overhanging portion, a lever having a bearing portion at one end thereof projecting from both sides of the lever, said frame having walls spaced apart substantially the length of such bearing portion and between which the latter is positioned, a bearing pin extending through said bearing portion and having its ends positioned in said walls, said lever projecting at its other end beneath said overhanging portion of said frame, a knife carried by said projecting end of said lever for co-operation with said fixed knife, and means for actuating said lever, substantially as described.

3. In a shearing mechanism, a frame having a portion arranged to overhang a roll table and having the portion thereof below the delivery line of such table arranged to lie wholly at one side thereof, a fixed knife carried by said overhanging portion, a lever having a bearing portion at one end thereof projecting from both sides of the lever, said frame having walls spaced apart substantially the length of such bearing portion and between which the latter is positioned, a bearing pin extending through said bearing portion and having its ends positioned in said walls, said lever projecting at its other end beneath said overhanging portion of said frame, a knife carried by said projecting end of said lever for co-operation with said fixed knife, and means for actuating said lever, comprising a pitman extending at its lower end into a slot in said lever and pivoted to the latter, and eccentric means co-operating with the upper end of said lever, substantially as described.

In testimony whereof I have hereunto set my hand.

RICHARD W. MOSES.